United States Patent
Ganesh et al.

(10) Patent No.: US 9,277,401 B2
(45) Date of Patent: Mar. 1, 2016

(54) DEVICE UTILIZING AN OPTICAL SIGNAL TO ACCESS AN ACCESS POINT

(71) Applicant: QUALCOMM Incorporated, San Diego, CA (US)

(72) Inventors: Shriram Ganesh, San Diego, CA (US); Jose R. Menendez, San Diego, CA (US); William T. Frantz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/747,347

(22) Filed: Jan. 22, 2013

(65) Prior Publication Data
US 2014/0208387 A1 Jul. 24, 2014

(51) Int. Cl.
G06F 7/04 (2006.01)
H04W 12/04 (2009.01)
H04L 29/08 (2006.01)
H04W 84/12 (2009.01)

(52) U.S. Cl.
CPC ............... *H04W 12/04* (2013.01); *H04L 67/34* (2013.01); *H04W 84/12* (2013.01)

(58) Field of Classification Search
CPC ....... H04W 12/04; H04W 84/12; H04L 67/34
USPC ........................................................... 726/4
See application file for complete search history.

(56) References Cited

U.S. PATENT DOCUMENTS

| | | | |
|---|---|---|---|
| 5,553,315 A * | 9/1996 | Sobti et al. ..................... 455/509 |
| 8,509,431 B2 * | 8/2013 | Schmidt et al. ................. 380/44 |
| 2002/0126358 A1 * | 9/2002 | Volpi et al. ..................... 359/172 |
| 2004/0120297 A1 | 6/2004 | McDonnell et al. |
| 2004/0266449 A1 | 12/2004 | Smetters et al. |
| 2006/0251256 A1 * | 11/2006 | Asokan et al. ................. 380/270 |
| 2010/0005294 A1 * | 1/2010 | Kostiainen et al. ........... 713/168 |
| 2010/0163613 A1 | 7/2010 | Bucher et al. |
| 2011/0135074 A1 * | 6/2011 | McNaughton et al. .... 379/93.02 |
| 2011/0153121 A1 * | 6/2011 | Minassian ......................... 701/2 |

(Continued)

FOREIGN PATENT DOCUMENTS

CN 102457331 A 5/2012
WO 2007045937 A1 4/2007

OTHER PUBLICATIONS

Saxena, et al., "Secure Device Pairing Based on a Visual Channel: Design and Usability Study", IEEE Transactions on Information Forensics and Security, 2010, pp. 28-38.

(Continued)

*Primary Examiner* — Mohammad W Reza
(74) *Attorney, Agent, or Firm* — Blakely Sokoloff Taylor & Zafman, LLP

(57) ABSTRACT

Disclosed is a device that receives an optical signal having an authorization code that allows the device to utilize an access point to obtain access to the Internet and other networks. The device may include: a modem; a light sensor; and a processor. The light sensor may receive an optical signal from a light source. The processor may execute operations including: processing the received optical signal to identify an authorization code and to connect the device through the modem to the access point based upon the authorization code such that the device may obtain access to the Internet and other networks.

37 Claims, 4 Drawing Sheets

(56) References Cited

U.S. PATENT DOCUMENTS

2012/0036076 A1* 2/2012 Vanderwall et al. ............ 705/75
2012/0096141 A1 4/2012 Narjala

OTHER PUBLICATIONS

International Search Report and Written Opinion—PCT/US2014/012118—ISA/EPO—Apr. 3, 2014.

Saxena, et al., "Secure Device Pairing Based on a Visual Channel: Design and Usability Study", pp. 1-17.
CICTRnews, Researchers Envision an LED-Powered Wireless Network, Jan. 25, 2006, http://cictr.ee.psu.edu/CICTRnews/White%20LED/Researchers%20Envision%20LED-Powered%20Wireless%20Network%20%20PwC%20.
Martin Lamonica, Marvell Chip Makes Appliances and LED Lights 'Smart', Jan. 9, 2012, http://ces.cnet.com/8301-33375_1-57353840/marvell-chip-makes-appliances-and-led-lights-smart/.

* cited by examiner

DEVICE UTILIZING AN OPTICAL SIGNAL TO ACCESS AN ACCESS POINT

BACKGROUND

1. Field

The present invention relates to a device that receives an optical signal having an authorization code that allows the device to utilize an access point.

2. Relevant Background

Free wireless hotspots (e.g., Wi-Fi, MiFi hotspots) are a great service to people utilizing wireless devices. Free ones from a provider (e.g., a coffee shop; a restaurant; a store; a hotel; a mall; etc.) are accessible by anyone within range. Unfortunately, these free ones are often utilized by people not utilizing the provider (e.g., the coffee shop; the restaurant; the store; the hotel; the mall; etc.). This may include people outside of the provider but within enough range to use the free wireless hotspot.

Private and/or paid for wireless hotspots often broadcast their service set identification SSID and provide a password that a user is required to manually enter via their device to authenticate it as a legitimate user device. In some cases, a user may manually capture a quick response (QR) code with their device's camera. The QR code contains the password the device needs to submit for authentication.

These types of processes to provide users with wireless hotspot access are useful. However, in both cases, issuing access passwords and entering them manually can be cumbersome and as a result the passwords do not rotate often. This "hassle-factor" means these types of processes have limitations in terms of controlling the group of user devices allowed to access the hotspot.

SUMMARY

Aspects of the invention may relate to an apparatus and method for a device that receives an optical signal having an authorization code that allows the device to utilize an access point to obtain access to the Internet and other networks. The device may include: a modem; a light sensor; and a processor. The light sensor may receive an optical signal from a light source. The processor may execute operations including: processing the received optical signal to identify an authorization code and to connect the device through the modem to the access point based upon the authorization code such that the device may obtain access to the Internet and other networks.

DETAILED DESCRIPTION

The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Figure 1:
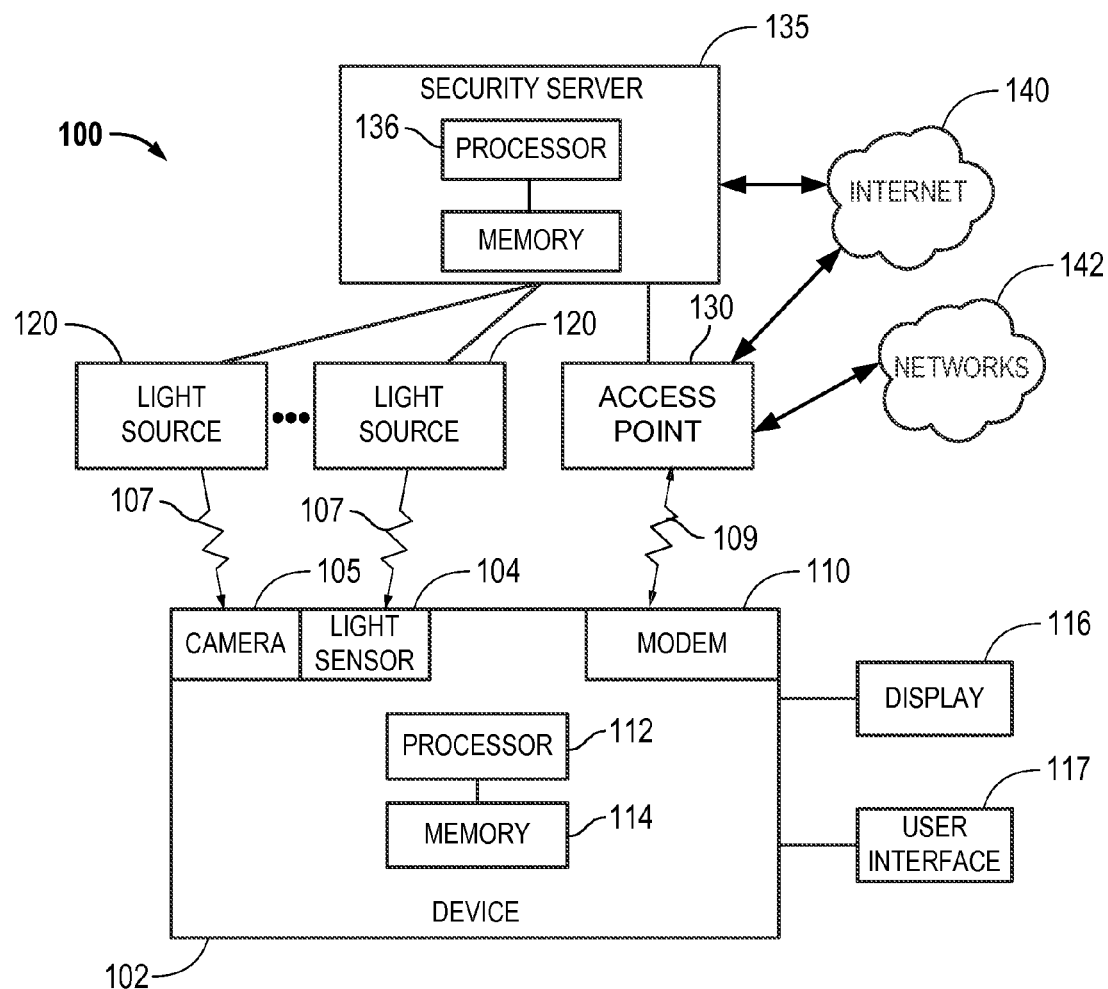
FIG. 1 is block diagram of a system in which aspects of the invention related to a device that receives an optical signal having an authorization code that allows the device to utilize an access point may be practiced.

With reference to FIG. 1, FIG. 1 is block diagram of a system 100 in which embodiments of the invention may be practiced. In particular, system 100 illustrates a device 102 that may be utilized by a user to obtain access to an access point 130 which may grant the user access to the Internet 140 and other networks 142.

According to one embodiment of the invention, as will be described, access for the device 102 through the access point 130 to the Internet 140 and other types of networks 142 may be provided by system 100 by utilizing light sources 120 and a security server 135. In particular, device 102 may include a modem 110 and a light sensor 104. Further, device 102 may include a processor 112, a memory 114, a display 116, and a user interface 117.

For example, a light sensor 104 of the device 102 may receive an optical signal 107 from a light source 120 that is associated with the access point 130. As will be described, device 102 may be allowed to interface with the access point 130 based upon optical signals 107 received from the light sources 120.

As an example, processor 112 of device 102 may be configured to execute operations that include: processing received optical signals 107 from the light sources 120 to identify an authorization code; and using the authorization code, may command the connection of device 102 through the modem 110 to the access point 130. In particular, modem 110 may transmit the authorization code through the link 109 to the access point 130. If the authorization code is accepted by the access point 130, the device 102 will be granted access to the Internet 140 and other networks 142 via the access point 130. In this way, system 100 acts as an automatic distributor of authorization codes to grant device users the ability to access the Internet 140 and other types of networks 142. Memory 114 may store operations, applications, programs, routines, etc. to aid implementing this functionality.

In one embodiment, access point 130 may be a wireless router (e.g., a WiFi router, MiFi router etc.) or it may be wired router, as are commonly utilized, but it should be appreciated that any type of router may be utilized. As is known to those skilled in the art, wired routers 130 may be connected to a device 102 via an appropriate wired link 109 to a modem 110 to provide access to the Internet 140 or other types of networks 142 (e.g., an Ethernet system). Further, as an example, access point 130 may be a wireless router, such as a WiFi router, to which a wireless device 102 via modem 110 and wireless link 109 may connect to provide the wireless device access to the Internet 140 or other types of networks 142 in a local area network (LAN) from a wireless router provider (e.g., a office; a school; etc.).

Device 102 may include either a wire or wireless based modem 110 (e.g., a cable/wire receiving modem or a wireless modem (a transceiver) that includes a wireless receiver and transmitter) to receive and transmit data through link 109 to access point 130 such that the access point may provide the device 102 access to the Internet 140 and other types of networks 142. Further, device 102 may include common device features such as a display 116, a camera 105, as well as a user interface 117 (e.g., a keyboard, a keypad, a touch screen input, etc.). It should be appreciated that any type of device 102 may be utilized, such as: personal computers, desktop computers, laptop computers, kiosks, mobile computers, mobile devices, personal digital assistants, wireless phones, cell phones, smart phones, tablets, or any type of portable or non-portable computing device.

In one embodiment, a light sensor 104 may be used to receive the optical signals 107 from the light sources 120. For example, the light sensors 104 utilized may be a proximity sensor, a solar cell, a camera 105, or combinations thereof. As one example, the proximity sensor may be an ambient light sensor that is commonly utilized on devices to sense changes in light to brighten/darken the display 116. As yet another example, a camera 105 may be used to receive the optical signals 107. As an even further example, a solar cell may be used as the light sensor 104. These different types of light sensors 104 under the control of the processor 112 may be utilized to receive the optical signals 107 and the authorization code contained therein. In particular, processor 112 may execute an application to decipher the authorization code in the optical signal 107 and may command the connection of device 102 through modem 110 to access point 130 to obtain access to the Internet 140 and other networks 142 for device 102 based on the authorization code. If the access point 130 accepts the authorization code as being valid it grants access and, if not, it denies access. This may all be accomplished automatically based on the authorization code such that a user does not have to type in a password.

As examples, device 102 may be a wireless device (e.g., a cell-phone or tablet) and access point 130 may be a wireless router (e.g., WiFi) to which the wireless device connects wirelessly (e.g., via a wireless link). On the other hand, device 102 may be a wired device, such as, a desktop computer or a kiosk, and access point 130 may be a wired router to which the basically fixed position wired device connects via a cable or wire (e.g., via a wired link). As an example, device 102 may be desktop computer that runs on an Ethernet network and that is granted access to a virtual private network (VPN). As another example, access point 130 could be a wireless/mobile router (e.g., a MiFi router) and device 102 could be a basically fixed position device (e.g., a desktop computer). As yet another example, access point 130 could be a wireless/mobile device (e.g., a MiFi router on a lunch truck) and device 102 could also be a wireless device (e.g., a cell-phone or tablet). Thus, there are many different possibilities as to the types of wireless or wired access points 130 and wireless or wired devices 102 that may be utilized.

Looking more particularly at the authorization code, the authorization code transmitted in the optical signal 107 may also include the service set identification (SSID) for a wireless access point 130 and/or the media access control (MAC) addresses for the access point and/or other possible types of security codes. Hereinafter these types of codes will be referred to as authorization codes for ease of reference.

In one embodiment, security server 135 under the control of processor 136 and in conjunction with memory 137 may determine the authorization code and may command that the light sources 120 transmit the authorization code as optical signals 107 to the devices 102 and may also transmit the authorization code to the access point 130 to control the access point 130 access. In this way, the access point 130 has the authorization code determined by the security server 135 such that it may permit or deny use of the access point 130 by a device 102 based upon the received authorization code from the device 102 to access the Internet 140 and other networks 142. Thus, in one embodiment, the security server 135 may set the authorization code to allow devices 102 to obtain access through the access point 130 to allow device users the ability to access the Internet 140 and other types of networks 142. Thus, the authorization code of the optical signal 107 provides a password that the user does not have to manually enter.

In particular, the optical signal 107 including the authorization code transmitted by the light source 120, which is received by the light sensor 104 of the device 102, may be a digital optical signal. In one embodiment, the light source 120 may be a light emitting diode (LED). The light source 120 will be hereinafter referred as LED 120 for ease of reference. In one example, the use of an LED 120 as a light source transmits an optical signal 107 including the authorization code to the device 102 as a digital signal (e.g., in terms of 1's and 0's). In particular, LEDs 120 may be turned on and off (e.g., 1's and 0's) in a time controlled manner to provide the device 102 with an authorization code in an optical digital signal—as set by the security server 135. The security server 135 may provide the same authorization code to the access point 130 such that the access point 130 can authenticate devices 102 in order to allow them or disallow them from access to the Internet 140 and other networks 142.

Further, it should be noted that the use of optical signals 107, such as those generated by LEDs 120 do not pass through walls and therefore limit access to the access point 130 to devices that are within line of sight of LEDs 120 (including reflections, etc). Additionally, although LEDs have been described as one type of source for optical signals, it should be appreciated by those of skill in the art that other types of light sources may be utilized. For example, incandescent light sources and fluorescent light sources may also be utilized.

As previously described, security server 135 may be utilized to control the LEDs 120 and to control the access point 130. Security sever 135 may be a local computing device at the facility/room or may be an external non-local computing device located elsewhere via a network 142 or the Internet 140 that is accessible through the cloud. In either instance of where the security server 135 is located, the device 102 may be a local device in the facility/room. Further, in one embodiment, the security server 135 may be part of the access point 130. In particular, security server 135 may set the authorization code for the access point 130 and may command the transmission of the authorization code as optical signals 107 via LEDs 120 to devices 102 such that the devices may gain access through the access point 130 to the Internet 140 and other networks 142 if the authorization code is authenticated by the access point.

In particular, as previously described, a light sensor 104 of the device 102 may receive the authorization code of the optical digital signal 107 from the LEDs 120 and the processor 112 of the device 102 may process the received optical signal to decipher the authorization code. Processor 112 of the device 102 may command the transmission of the authorization code through the modem 110 via link 109 to the access point 130 to authenticate the device 102 with the access point 130 in order to utilize the access point 130 to gain access to the Internet 140 and networks 142. If the access point 130 accepts the authorization code (e.g., it matches the set authorization code), the access point 130 may allow the device to gain access to the Internet 140 and other networks 142. However, if the access point 130 does not accept the authorization code (e.g., it does not match the set authorization code), the access point 130 does not allow the device to gain access to the Internet 140 and other networks 142.

Further, as previously described, it should be noted that the authorization code may simply be a SSID and/or a MAC address of an access point 130 and/or may be a specific password set by the security server 135 and/or may be other types of security codes. Examples of various implementations will be hereinafter described. However, generally, embodiments of the invention relate to utilizing optical signals 107 that include authorization codes to provide security in controlling the physical area by means of line of sight in which users of devices 102 can utilize an access point 130 to obtain access to the Internet 140 and other networks 142. Furthermore, ease of access to utilize the device 102 to access the Internet 140 and other networks 142 is provided by not requiring the user to enter a password. Moreover, security may be provided by rotating new authorization codes at different time intervals such that devices 102 out of the physical area by line of sight do not receive the new authorization code are denied access whereas devices still within the physical area by line of sight that receive the new authorization code are re-authenticated with the access point 130 automatically.

Figure 2:
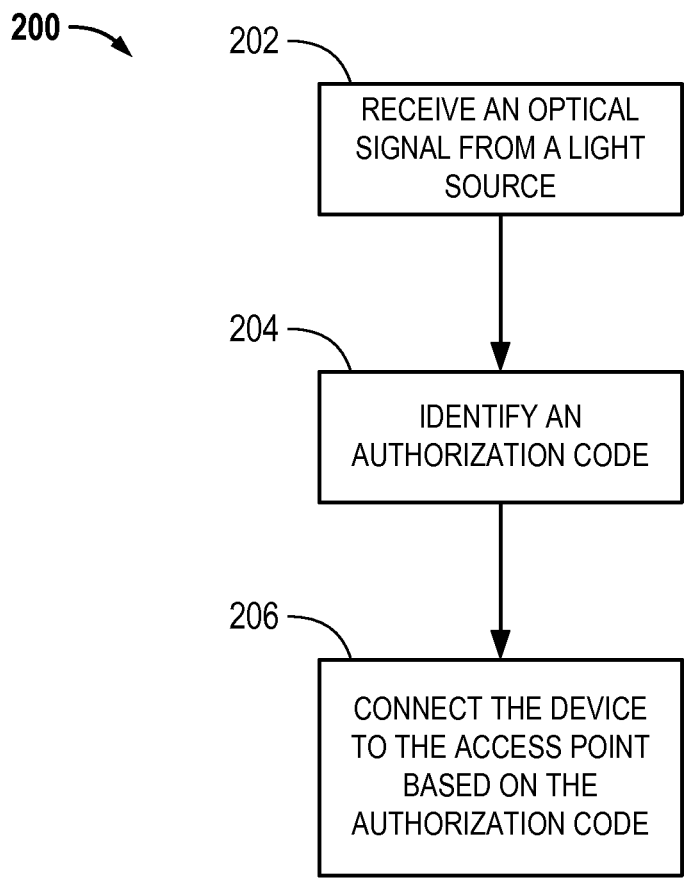
FIG. 2 is a flow diagram illustrating a process implemented by the device.

Referring briefly to FIG. 2, FIG. 2 is a flowchart illustrating a process 200 for connecting a device to an access point based upon an authorization code. For example, at block 202, a device 102 receives an optical signal 107 from a light source (e.g., LED 120). The optical signal 107 may include an authorization code that may be associated with an access point 130. Next, the device 102 identifies and deciphers the authorization code from the received optical signal 107 (block 204). At block 206, the device 102 connects to the access point 130 based upon the authorization code such that the device can gain access to the Internet 140 and networks 142 through the access point 130. When the authorization code is deciphered, the device 102 may pursue connecting to the access point 130 based upon device settings or user direction. In one embodiment, before connecting to an access point 130, additional steps may be implemented, such as: looking up in a table whether the user has been previously approved for the access point; determining whether the access point is white-listed (if so connection is approved); and determining whether the access point is black-listed (if so connection is disapproved). Whether the user says yes or no to a prompt, the user may also be asked to white-list or black-list this access point 130 and this white-list or black-list data for the access point may be stored.

Figure 3:
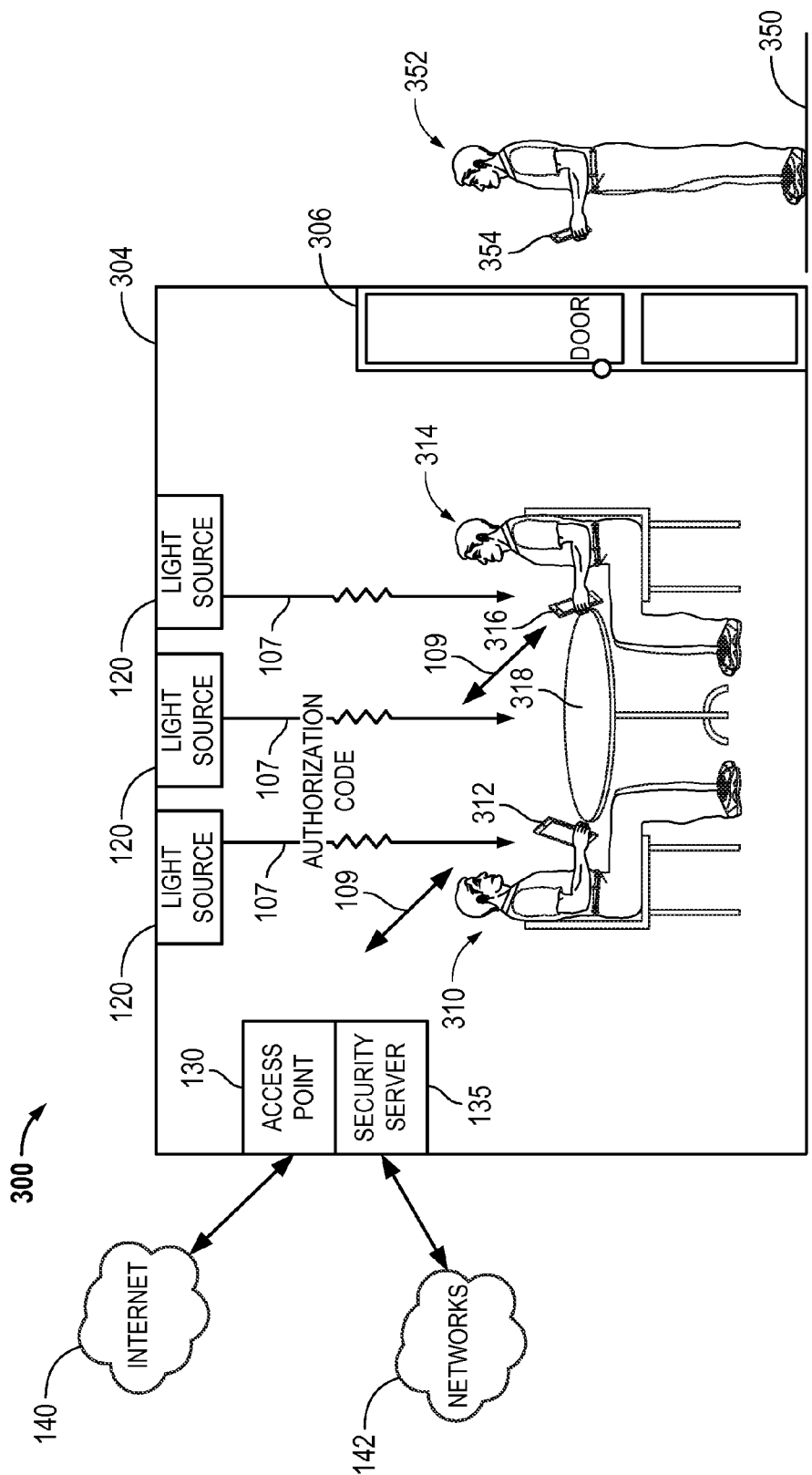
FIG. 3 is a diagram illustrating a particular example of the use of the device that receives the optical signal having the authorization code that allows the device to utilize the access point.

With additional reference to FIG. 3, an example of an implementation will be described. As can be seen in FIG. 3, within a coffee shop 304, a plurality of LEDs 120 may be attached to the ceiling, walls, or other locations. Further, coffee shop 304 may include a wireless access point 130 which may provide users 310, 314 having wireless devices 312, 316 wireless accesses to the Internet 140 and networks 142 based upon controls set by the security server 135. Security sever 135 may be located within the coffee shop 304 or may be connected to the coffee shop through the Internet 140 or other networks 142.

As an example, users 310,314 sitting at a table 318, based upon optical signals 107 that include authorization codes received from LEDs 120 may gain access to the wireless access point 130. In particular, as previously described, the wireless devices 312,316 may process the received optical signal 107 to identify and decipher an authorization code from the optical signal 107 and may transmit the authorization code via wireless links 109 to the wireless access point 130. If the wireless access point 130 identifies the authorization codes as being authorized, the wireless access point 130 may allow the wireless devices 312,316 to connect to the Internet 140 and other networks 142. As previously described, the authorization code may be a pre-set password selected by the security server 135 that is given to the wireless access point and that is transmitted as an optical signal 107 to the wireless devices 312,316. Because the optical signal does not travel through walls, this provides a predefined area to provide wireless access point 130 access to wireless devices 312,316.

On the other hand, users 352 having wireless devices 354 outside of the coffee shop 304 (e.g., outside of the door 306 of the coffee shop 304—on the sidewalk or street 350) cannot obtain the optical signals 107 from the LEDs 120 including the authorization code such that they cannot obtain wireless access through the wireless access point 130 to the Internet 140 and networks 142. Thus, the use of optical signals 107, such as those generated by LEDs 120 do not pass through walls and provide a pre-defined area range to allow access to the wireless access point 130. Further, although an example of a coffee shop has been given, it should be appreciated that implementations of the invention may be utilized with any type of walled-structure (e.g., buildings, halls, malls, restaurants, stores, hotels, airports, universities, etc.)

Depending upon whether the intent of the system 100 is security or ease of access, the intent may be used to determine whether the LED optical signals 107 should shine on reflective surfaces or matte ones (e.g., that scatter the light) in the design of the environment. For example, in coffee shop 304, reflected surfaces or matte ones may be utilized. However, it should be appreciated that if reflective surfaces cannot be avoided that dummy light sources may be used to emit "noise" so that only a direct line of sight to an LED 120 can provide strong enough signal strength such that the LED optical signal 107 can be read by the wireless device 312, 316. Of course, wireless devices 354 of users 352 outside of the coffee shop 304 who cannot obtain strong enough LED optical signals 107 cannot obtain access to the wireless access point 130.

However, if the goal is to ease access to a network through the wireless access point 130 (i.e., widely and quickly distribute authorization codes) then the optical signals 107 may be shined out of the walled area. For example, optical signals 107 may be emitted outside of the coffee shop 304 through door 306 and windows to other users 352 having wireless devices 354 or additional LEDs 120 may be placed outside the walled area.

In one embodiment, once a wireless device 312,316 is connected to the wireless access point 130, the wireless access point 130 may provide the wireless devices 312,316 the next authorization codes (e.g., passwords, etc.) for a pre-defined period of time (e.g., Z minutes) such that the wireless devices 312,316 can access the Internet 140 and other networks 142 through the wireless access point 130. Thus, the authorization code may be periodically updated by the security server 135. For example, the authorization code may be updated every minute, every hour, every day, every week, etc., or for any period of time as defined by the security server 135. In other words, the security server 135 may periodically select new authorization codes that are given to the wireless access point 130 for authorization and that are transmitted to the wireless devices 312,316 through LEDs 120 in new optical signals 107. Thus, in one embodiment, security server 135 may roll the authorization code for the wireless access point 130 and wireless devices 312,316 on a schedule. In this way, wireless devices 312,316 that are no longer in line of sight of the LEDs 107 may be disconnected from the wireless access point 130 as they are no longer in line of sight and therefore do not have the correct authorization code. This enforces that wireless access point users have been inside the line of sight area of the LED 120 in the last Z minutes.

Also, as will be described, processor 112 of a wireless device 312,316 may also implement an application to connect the wireless device through the modem 110 via wireless link 109 to the wireless access point 130. Such an application may include a log-in page, as will be described.

In this embodiment, wireless device connectivity may be controlled at the application or browser level. For example, LEDs 120 may emit rolling authorization codes and any wireless device 312,316 that desires to connect to the wireless access point 130 would install a connection application that collects the rolling authorization codes from the optical signals 107.

Figure 4:
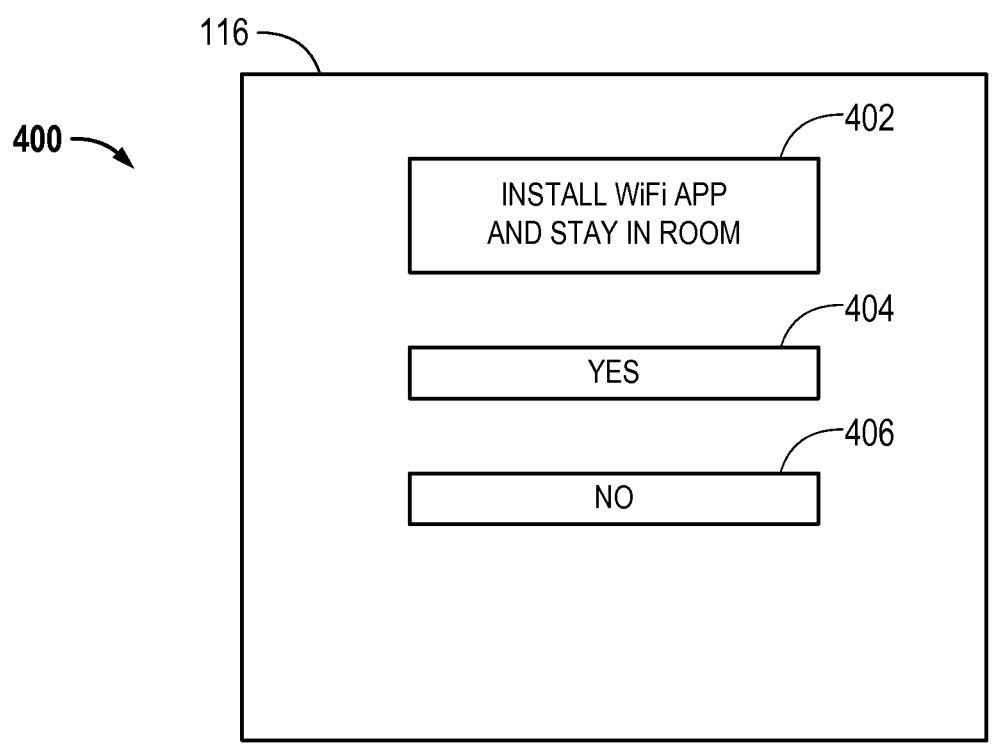
FIG. 4 is a diagram illustrating an example of a log-in page that may be utilized.

With additional reference to FIG. 4, an example of a log-in page 400 is illustrated. As an example, a user 310 of a wireless device 312 may open a browser, and the wireless access point 130 may redirect all requests to login page 400 that includes a box display 402 that states: "INSTALL Wi-Fi APP AND STAY IN ROOM". Assuming the user clicks the YES button 404, wireless device 312 may install an application provided by security server 135 through wireless access point 130 that provides the user's device the ability to decipher rolling authorization codes in the optical signals 107 from the light sources (e.g., LEDs 120) in the room and transmits them through the modem 110 to wireless access point 130, which likewise receives the rolling authorization codes to authenticate the wireless device 312, thereby allowing it to obtain Internet 140 and other network 142 access. On the other hand, if the user clicks the NO button 406, wireless device 312 will not install the application and it will not be able to obtain Internet and other network access through the wireless access point 130. However, even if a user installs the application, if the wireless device 312 goes out of line of sight of the LEDs 120, such that it does not receive the rolling authorization codes in the optical signals 107, the wireless device 312 will lose authentication by the wireless access point 130 and it will be denied access to the Internet 140 and other networks 142. Conversely, when the wireless device 312 returns to line of sight of the LEDs to receive the rolling authorization codes in the optical signals 107, it may then be re-authenticated again by the wireless access point 130 such that it can again be granted access. In one embodiment, the user does not need to install the application as it may, for example, be embedded in the operating system of the wireless device. A user may be able to turn on or off this functionality or it may be automatically performed dependent upon the configuration of the device.

Accordingly, there are many implementations that may be utilized to take advantage of the use of light-based signals to provide authorization codes to allow devices to utilize a access point for access to the Internet and other networks. It should be appreciated that any type of wireless or non-wireless device that includes a light sensor component 104 (e.g., a camera, a proximity sensor, an ambient light sensor, a photon sensor, a solar cell, etc.) that is able to detect the optical signal 107 from a light source 120 may be utilized. In particular, any type of wireless or wired device may record and process the optical signal (e.g., which provides an authorization code), and based upon transmitting the authorization code (e.g., a password, etc.) through its modem 110 to the access point 130, may allow the device through the access point 130 to access the Internet 140 and other networks 142. It should be appreciated that the previously-described examples may apply to any type of wireless or wired device in combination with any type of wireless or wired access point.

As previously described, a device may be a wireless device (e.g., a cell-phone or tablet) and the access point may be a wireless router (e.g., a WiFi router) to which the wireless device connects wirelessly (e.g., via a wireless link). On the other hand, the device may be a wired device, such as a desktop computer or a kiosk, and the access point may be a wired router to which the basically fixed position wired device connects via a cable or wire (e.g., via a wired link). As an example, the wired device may be a desktop computer that runs on an Ethernet network and that is granted access to a virtual private network (VPN). As another example, the access point could be a wireless/mobile router (e.g., a MiFi router) and the device could be a basically fixed position device (e.g., a desktop computer). As yet another example, the access point could be a mobile/wireless router (e.g., a MiFi router on lunch truck) and the device could also be a wireless device (e.g., a cell-phone or tablet). Thus, there are many different possibilities as to the types of wireless or wired access points and wireless or wired devices that may be utilized.

It should be appreciated that aspects of the invention previously described may be implemented in conjunction with the execution of instructions by processors of the devices and the server, as previously described. Particularly, circuitry of the devices and the server, including but not limited to processors, may operate under the control of a program, routine, or the execution of instructions to execute methods or processes in accordance with embodiments of the invention. For example, such a program may be implemented in firmware or software (e.g. stored in memory and/or other locations) and may be implemented by processors and/or other circuitry of the devices and the server. Further, it should be appreciated that the terms processor, microprocessor, circuitry, controller, etc., refer to any type of logic or circuitry capable of executing logic, commands, instructions, software, firmware, functionality, etc It should be appreciated that when the wireless device and the other devices are mobile or wireless devices that they may communicate via one or more wireless communication links through a wireless network that are based on or otherwise support any suitable wireless communication technology. For example, in some aspects the wireless device and the other devices may associate with a network including a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium. As is well known, a mobile wireless device may therefore wirelessly communicate with other mobile devices, cell phones, other wired and wireless computers, Internet web-sites, etc.

The techniques described herein can be used for various wireless communication systems such as Code Division Multiple Access (CDMA), Time division multiple access (TDMA), Frequency Division Multiple Access (FDMA), Orthogonal Frequency-Division Multiple Access (OFDMA), Single Carrier FDMA (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers Interim Standard (IS)-2000, IS-95 and IS-856 standards. A TDMA system can implement a radio technology such as Global System for Mobile Communications (GSM). An OFDMA system can implement a radio technology such as Evolved Universal Terrestrial Radio Access; (Evolved UTRA or E-UTRA), Ultra Mobile Broadband (UMB), Institute of Electrical and Electronics Engineers (IEEE) 802.11 (Wi-Fi), IEEE 802.16 (WiMAX), IEEE 802.20, Flash-OFDM™, etc. Universal Terrestrial Radio Access (UTRA) and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), a tablet, a mobile computer, a laptop computer, a tablet, an entertainment device (e.g., a music or video device), a headset (e.g., headphones, an earpiece, etc.), a medical device (e.g., a biometric sensor, a heart rate monitor, a pedometer, an EKG device, etc.), a user I/O device, a computer, a wired computer, a fixed computer, a desktop computer, a server, a point-of-sale device, an entertainment device, a set-top box, or any other suitable device. These devices may have different power and data requirements In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a Wi-Fi station) to access the other network or some other functionality.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method to connect a device to an access point comprising:
   receiving an optical signal from a light source over the air with a light sensor;
   identifying a periodically updated authorization code based upon the received optical signal, wherein the authorization code includes a service set identification; and
   connecting the device to the access point wirelessly over radio frequency based upon the periodically updated authorization code.

2. The method of claim 1, wherein the light sensor includes at least one of a camera, a proximity sensor, an ambient light sensor, or a solar cell.

3. The method of claim 1, further comprising executing an application to decipher the authorization code in the optical signal and to connect the device to the access point.

4. The method of claim 1, wherein the received optical signal that includes the authorization code is a digital signal transmitted by a light emitting diode (LED) associated with the access point.

5. A device comprising:
   a modem;
   a light sensor to receive an optical signal over the air from a light source; and
   a processor to execute operations comprising:
      processing the received optical signal to identify a periodically updated authorization code, wherein the authorization code includes a service set identification;
      connecting the device through the modem wirelessly over radio frequency to an access point based upon the periodically updated authorization code.

6. The device of claim 5, wherein the light sensor includes a camera.

7. The device of claim 5, wherein the light sensor includes a proximity sensor.

8. The device of claim 5, wherein the light sensor includes an ambient light sensor.

9. The device of claim 5, wherein the light sensor includes a solar cell.

10. The device of claim 5, wherein the processor further executes an application to decipher the authorization code in the optical signal and to connect the device to the access point.

11. The device of claim 5, wherein the received optical signal that includes the authorization code is a digital signal transmitted by a light emitting diode (LED) associated with the access point.

12. A computer program product executed at a device comprising:
   a non-transitory computer-readable medium comprising code for:
      identifying a periodically updated authorization code based upon a received over the air optical signal via a light sensor, wherein the authorization code includes a service set identification; and
      connecting the device to an access point through a modem wirelessly over radio frequency based upon the periodically updated authorization code.

13. The computer program product of claim 12, wherein the light sensor is a proximity sensor.

14. The computer program product of claim 12, wherein the light sensor includes a camera, a proximity sensor, an ambient light sensor, or a solar cell.

15. The computer program product of claim 12, further comprising code for executing an application to decipher the authorization code in the optical signal and to connect the device to the access point.

16. The computer program product of claim 12, wherein the received optical signal that includes the authorization code is a digital signal transmitted by a light emitting diode (LED) associated with the access point.

17. A device comprising:
   means for receiving an optical signal from a light source over the air;
   means for identifying a periodically updated authorization code based upon the received optical signal, wherein the authorization code includes a service set identification; and
   means for connecting the device to an access point wirelessly over radio frequency based upon the periodically updated authorization code.

18. The device of claim 17, wherein the light sensor includes at least one of a camera, a proximity sensor, an ambient light sensor, or a solar cell.

19. The device of claim 17, further comprising means for executing an application to decipher the authorization code in the optical signal and to connect the device to the access point.

20. The device of claim 17, wherein the received optical signal that includes the authorization code is a digital signal transmitted by a light emitting diode (LED) associated with the access point.

21. A security server apparatus comprising:
   a hardware processor to execute operations comprising:
      determining a periodically updated authorization code, wherein the authorization code includes a service set identification;
      commanding a light source to transmit an optical signal including the periodically updated authorization code over the air to a light sensor of a device; and
      transmitting the periodically updated authorization code to an access point to enable communication with the device wirelessly over radio frequency.

22. The security server apparatus of claim 21, wherein the authorization code is a digital signal and the light source is a light emitting diode (LED).

23. The security server apparatus of claim 21, wherein the security server is a non-local cloud-based security server and the device is a local device within a room.

24. The security server apparatus of claim 21, wherein the security server is a local security server and the device is a local device within a room.

25. The security server apparatus of claim 21, wherein the security server is part of the access point.

26. A method to enable a device to connect to an access point comprising:
   determining a periodically updated authorization code, wherein the authorization code includes a service set identification;
   commanding a light source to transmit an optical signal including the periodically updated authorization code over the air to a light sensor of the device; and
   transmitting the periodically updated authorization code to the access point to enable communication with the device wirelessly over radio frequency.

27. The method of claim 26, wherein the authorization code is a digital signal and the light source is a light emitting diode (LED).

28. A computer program product executed at a security server comprising:

a non-transitory computer-readable medium comprising code for:

determining a periodically updated authorization code, wherein the authorization code includes a service set identification;

commanding a light source to transmit an optical signal including the periodically updated authorization code over the air to a light sensor of a device; and transmitting the periodically updated authorization code to an access point to enable communication with the device wirelessly over radio frequency.

29. The computer program product of claim 28, wherein the authorization code is a digital signal and the light source is a light emitting diode (LED).

30. The computer program product of claim 28, wherein the security server is a non-local cloud-based security server and the device is a local device within a room.

31. The computer program product of claim 28, wherein the security server is a local security server and the device is a local device within a room.

32. The computer program product of claim 28, wherein the security server is part of the access point.

33. A security server comprising:

means for determining a periodically updated authorization code, wherein the authorization code includes a service set identification;

means for commanding a light source to transmit an optical signal including the periodically updated authorization code over the air to a light sensor of a device; and means for transmitting the periodically updated authorization code to an access point to enable communication with the device wirelessly over radio frequency.

34. The security server of claim 33, wherein the authorization code is a digital signal and the light source is a light emitting diode (LED).

35. The security server of claim 33, wherein the security server is a non-local cloud-based security server and the device is a local device within a room.

36. The security server of claim 33, wherein the security server is a local security server and the device is a local device within a room.

37. The security server of claim 33, wherein the security server is part of the access point.

* * * * *